June 28, 1960 H. A. THOMPSON 2,942,733
SEPARATORS FOR LIQUIDS HAVING DIFFERENT SPECIFIC GRAVITIES
Filed Jan. 18, 1956 9 Sheets-Sheet 2
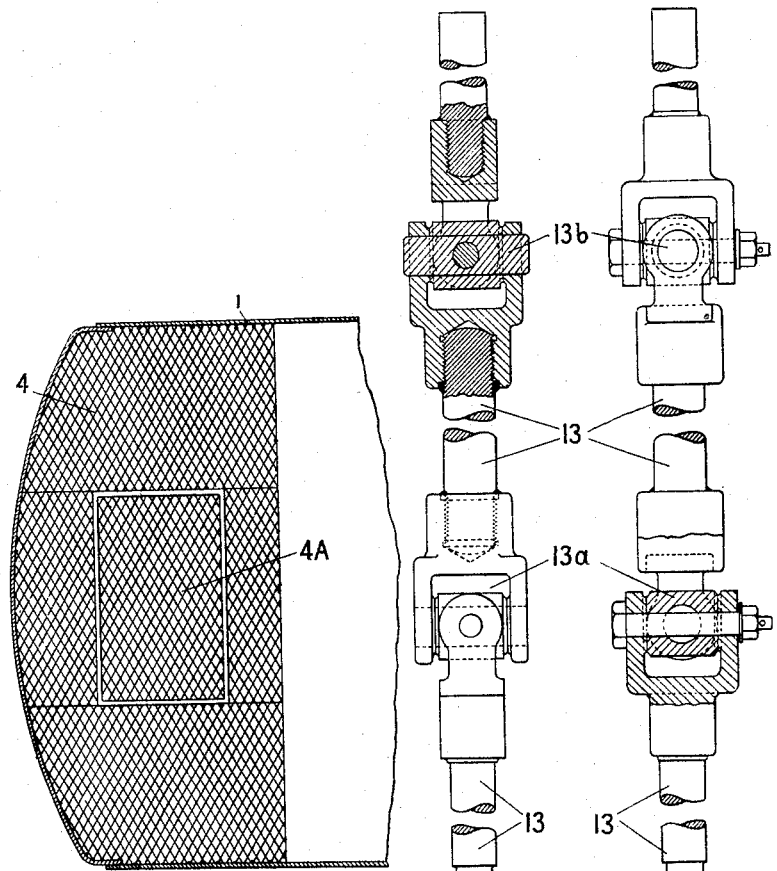
FIG.2  FIG.9  FIG.10
*INVENTOR*
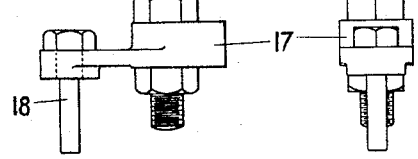

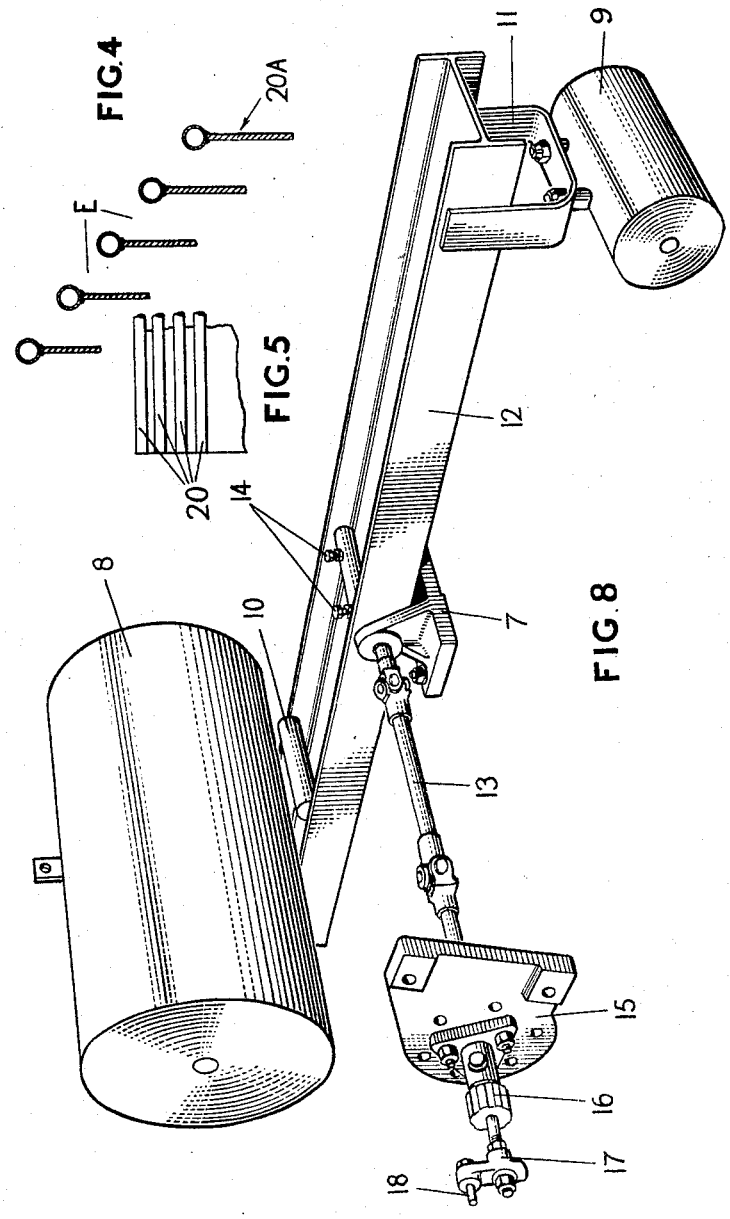

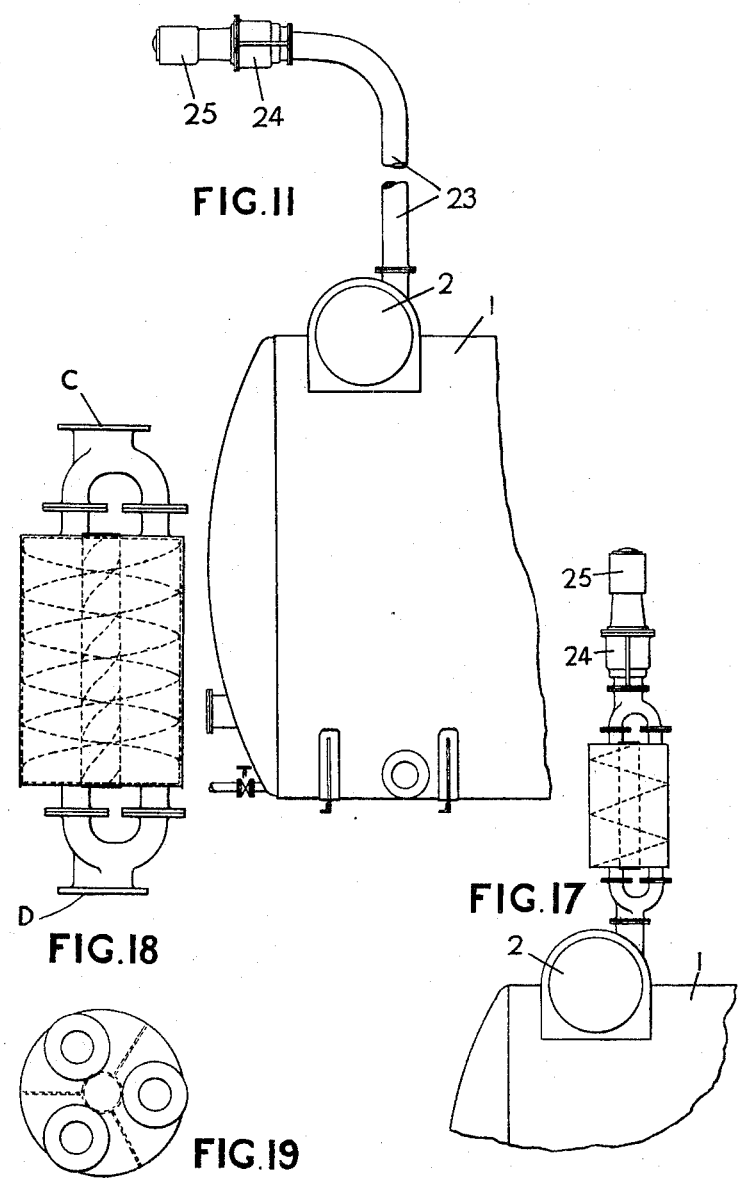

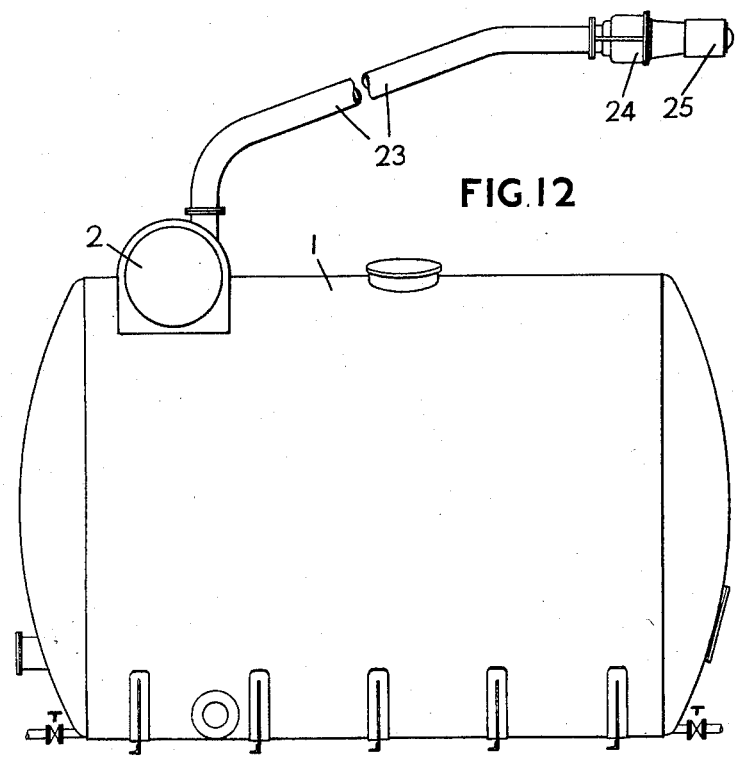

June 28, 1960     H. A. THOMPSON     2,942,733
SEPARATORS FOR LIQUIDS HAVING DIFFERENT SPECIFIC GRAVITIES
Filed Jan. 18, 1956     9 Sheets-Sheet 8

*INVENTOR*
*Herbert Alexander Thompson*

June 28, 1960    H. A. THOMPSON    2,942,733
SEPARATORS FOR LIQUIDS HAVING DIFFERENT SPECIFIC GRAVITIES
Filed Jan. 18, 1956    9 Sheets-Sheet 9

FIG.21    33 34 35 36 37 38

*INVENTOR*
*Herbert Alexander Thompson*

ID united States Patent Office 2,942,733
Patented June 28, 1960

2,942,733

SEPARATORS FOR LIQUIDS HAVING DIFFERENT SPECIFIC GRAVITIES

Herbert Alexander Thompson, Benton, Newcastle-upon-Tyne, England, assignor of one-half to Coastguard Separators Limited, Newcastle-upon-Tyne, England, a British company Filed Jan. 18, 1956, Ser. No. 559,991

Claims priority, application Great Britain Oct. 11, 1955

1 Claim. (Cl. 210—519)

This invention relates to apparatus for separating liquids of different specific gravities from a mixture of such liquids which do not form a true mixible solution. For example apparatus according to the invention may be used to separate out oil from a solution of oil and water. One object of the present invention is to provide a separator of improved construction which will effect the desired separation in a more efficient manner than heretofore.

According to the present invention we provide apparatus for separating liquids of different specific gravities from a mixture of such liquids comprising a separating tank having corrugated baffles therein forming swirling chambers through which the mixture is passed, a collecting dome on the tank disposed out of the direct line of flow of the mixture and in position to collect the lighter liquid, a discharge valve through which the liquid collected in the dome may be discharged, a control lever pivotally mounted at its centre to control the operation of the discharge valve, a main displacement cylinder at one end of the lever where it projects into a collecting dome and a pilot displacement cylinder at the other end of the lever where it projects into the separating tank, the arrangement being such that the cylinders are weighted so as to act as displacement rams to control the movement of the lever.

In order that the invention may be clearly understood and readily carried into effect reference is now directed to the accompanying drawings given by way of example, in which:

Fig. 2 is a detail plan view of a compactor grid drawn to an enlarged scale as compared with Fig. 1.

Fig. 4 is a detail view of one assembly of shutter baffles of venturi design.

Fig. 5 is a detail view of another alternative assembly of shutter baffles of venturi design.

Fig. 8 is a perspective view of a control lever including displacement cylinders and transmission shafting.

Fig. 9 is a detail elevation in section and to an enlarged scale as compared with Fig. 8 of the transmission shafting and universal joints the operation of which is controlled by the lever.

Fig. 10 is a sectional plan of Fig. 9.

Fig. 11 is an elevation of a vertical oil-seal pipe.

Fig. 12 is an elevation of an oil seal pipe at an angle.

Fig. 17 is an elevation of a spiral form of oil-seal with an oil discharge valve mounted at the top.

Fig. 18 is an elevation of a spiral form of oil-seal made from welded steel plates with headers top and bottom.

Fig. 19 is a plan of the arrangement shown in Fig. 18.

Fig. 21 is a part sectional view of the assembly shown in Fig. 20, and

In the description of the drawings we shall for convenience refer to the separation of oil and water but these two liquids are taken merely as examples.

Figure 1:
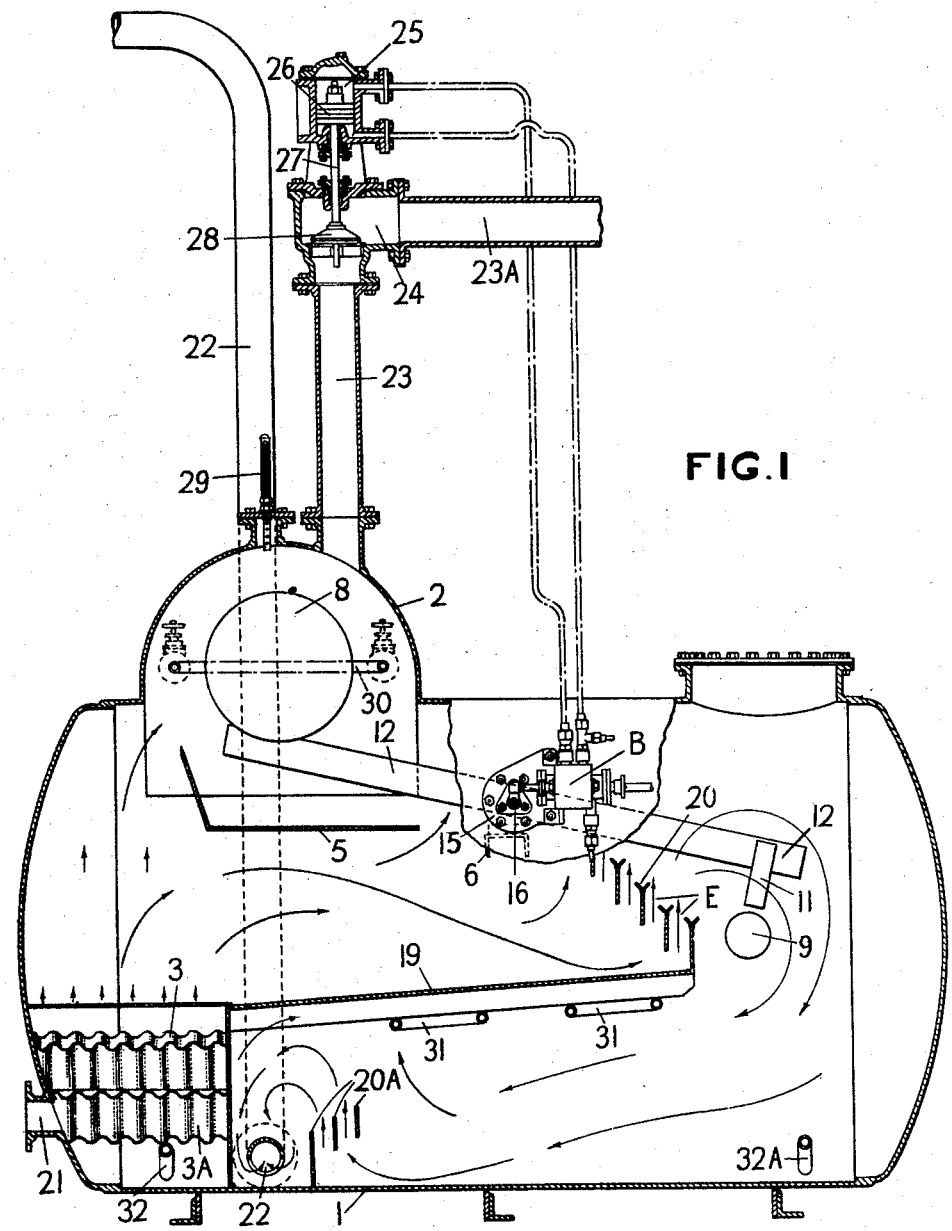
Fig. 1 is a sectional elevation of a separator according to the invention.
Figure 3:
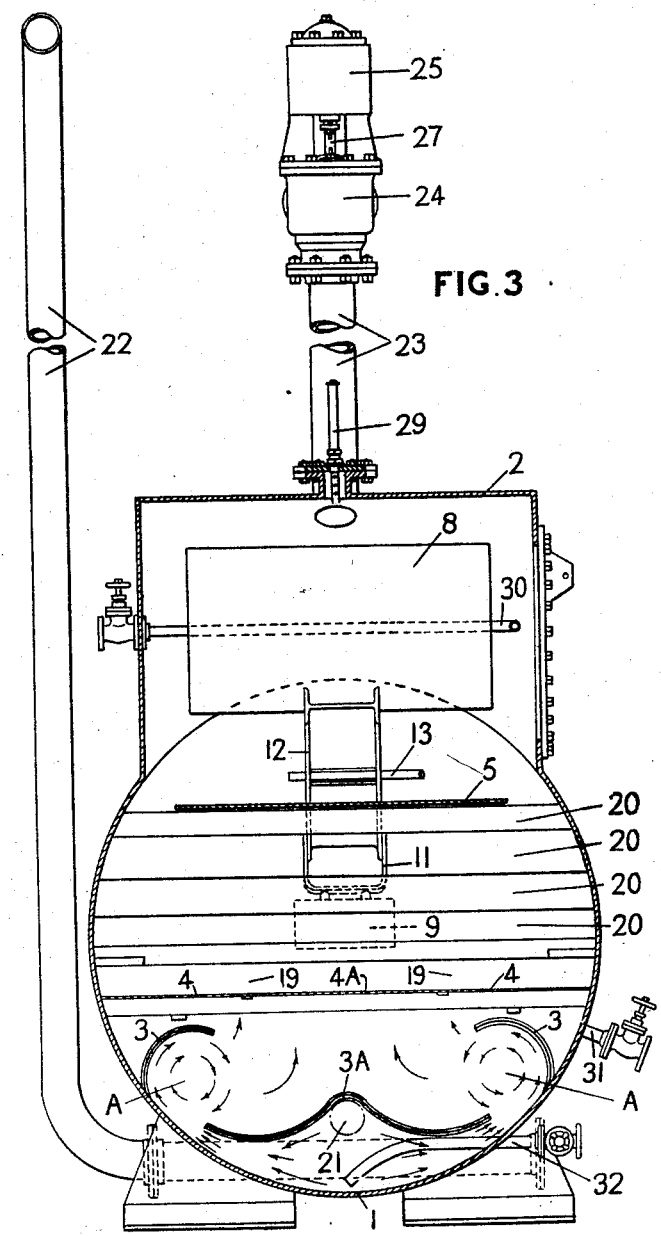
Fig. 3 is a cross-section of the separator shown in Fig. 1.

In the drawings 1 is the shell of a separator tank and 2 is an oil collecting dome provided at the top of the separator tank—see particularly Figs. 1 and 3. A compactor chamber is provided inside the tank 1 and this compactor chamber affords swirling chambers A formed by corrugated curved compactor baffles 3 disposed at each side of and to one end of the tank and by a central curved and corrugated baffle plate 3a. A compactor grid 4 extends across the inside of the tank 1 above the baffles 3 and 3a and 5 is a dome baffle plate. A lever bearer bracket 6 supports a lever fulcrum bracket 7 which carries a balanced lever 12.

The lever 12 is provided, at one end, with a main displacement cylinder 8 and at the other end with a pilot displacement cylinder 9 of the two cylinders being disposed on the lever at the same mass-centre from the fulcrum so that they both describe the same arc of travel. The main displacement cylinder 8 end of the lever has a compensating weight-volume bar 10 corresponding to the displacement of a stirrup 11 which carries the pilot cylinder 9, see particularly Fig. 8.

The lever 12 is coupled to a transmission shaft 13 which is provided with double universal joints 13a and 13b. The lever 12 is secured to the shaft 13 by securing tap bolts and lock nuts 14. The shaft 13 is extended through a combined gland and bracket 15 for a piston control valve indicated generally by the reference B. 16 is a gland nut and 17 is an operating lever from the transmission shaft 13 to the piston control valve B. The operating lever 17 has a pin 18 rocking of which actuates the mechanism of the valve B. All this mechanism is clearly illustrated in Fig. 8.

Returning to Fig. 1 it will be noted that the tank has a substantially horizontal centre division plate 19 to assist in directing the mixture into the desired paths as indicated by the arrows.

Shutter baffles plates 20 and 20A, with venturi attachments are provided as shown to break up droplets of water surrounded by a film of oil. Reference 21 indicates an oily water inlet opening and 22 is a cleansed water discharge outlet. The oil which is separated from the water is collected in the dome 2 and 23 is an oil seal pipe to an oil discharge valve which passes the oil on to an oil discharge pipe 23A which leads to a reception tank (not shown).

Reference 24 indicates the body of the oil discharge valve with a removable valve seat. 25 is a steam cylinder for operating a piston 26 of the oil discharge valve. The piston 26 is connected to a combined piston rod and valve rod 27 which is connected at its other end to an oil valve lid 28. A thermometer 29 is provided on the oil dome 2 and a steam heating coil or an electric immersion heater 30 is provided in the dome. Steam heating coils or electric immersion heaters 31 are provided in the lower chamber of the tank 1 below the plate 19. A drain pipe and shut off valve 32 for the compactor chamber is provided and also a drain pipe and shut off valve 32A for the lower chamber of the tank 1.

The piston control valve B is made up from an assembly of slabs 33, 34, 35, 36, 37, 38. The control valve B has a master piston 40 and a blow-over piston 41 and the slabs have fine port openings 39 around the diameter of the piston bore for each piston. Piston packing rings 42 are provided as indicated and a coiled spring indicated generally at 43 is disposed in the oil discharge valve for closing operation. 44 is a constant water pressure supply pipe to discharge valve.

The above is a general description of the apparatus and we shall now deal with one or two of the features in more detail before describing the operation of the apparatus.

The two cylinders 8 and 9 mounted on the lever 12 are not floats, they are designed as displacement rams having a carefully ascertained ratio to each other calculated in relation to volume and weight displacement for all the liquids in connection with which the apparatus is likely to be used. The pilot cylinder 9 is kept at the same leverage as the main cylinder but its weight is increased so that its weight per cubic inch is greater than a cubic inch of the main cylinder 8.

It will be readily understood that if the two cylinders be made the same size at the same leverage or if one cylinder has a smaller capacity at an increased leverage an adverse factor is set up in operation. For example, if both cylinders be of equal volume and are immersed in fresh water then they will both lose equal volumetric weight due to immersion and this is equivalent to both receiving an equal amount of upward thrust from the water. As the two cylinders are on opposite sides of the fulcrum an upthrust on one side is transmitted as a down thrust on the other side but when in a common liquid these thrust are equal and opposite and in the result they cancel out. If however, the main cylinder which can be either in oil or water is now immersed in oil, the volumetric weight loss is less and the main cylinder will sink. It will do so, however, at a greater rate than its volumetric weight loss in oil, because it has down thrust also imparted to it by the pilot cylinder which is still in water which gives it an upward thrust value which is transferred over the fulcrum to a down thrust on the main cylinder. We have found that this adversely affects the calculated weight volume loss values and after much experimenting we have now found that this upsetting thrust across the fulcrum can be overcome by using a pilot cylinder of a definitely ascertained smaller size in relation to the main cylinder. On basic principles, the pilot cylinder should theoretically have no volume but only weight, but as this is not possible we calculate to use the smallest possible size of cylinder whose volume will contain and house the maximum weight required for this pilot cylinder. We claim therefore that by this construction according to the invention we reduce the unwanted upthrust of the pilot cylinder volume to the lowest possible amount, but at the same time employ the maximum weight necessary on the pilot side of the fulcrum.

We have found that considerable accuracy is necessary in manufacturing and assembling the three component parts of the above mechanism viz. (1) the main cylinder, (2) the pilot-cylinder, (3) the fulcrum-lever on which these cylinders are mounted. The two cylinders must be machined to make them concentric inside and outside and all loading weights required for the balancing must be added inside the cylinders only to avoid volume increase which would cause error to arise. The fulcrum lever must be carefully machined and balanced in air so that it will stand in any position in which it is put on the fulcrum shaft, as it must not have any bias on either side of the fulcrum as that would be equal to either added volume or weight on one or other of the cylinders and so adversely affect the ultimate operative values. We have also ascertained, after careful experiment, that these cylinders must be mounted on the lever at the same mass-centre from the fulcrum so that they both describe exactly the same arc of travel. To achieve this, suitable supporting brackets must be built on to the lever for each cylinder and any inequalities of these seatings on one side or the other must be carefully compensated for, so that there is complete final balancing.

We have also found that as the outside shell of the tank 1 and the internal structures are preferably made from welded plates that there can be mal-alignment of the operating shaft 13 from the fulcrum lever 12 which has to pass out through the water-tight gland 15 on the side of the separator tank 1. To compensate for any error in alignment we employ a form of double universal joint 13, 13a which as illustrated in Figs. 9 and 10 consists of double eyes, centre blocks and hinge pins, which by their movement correct the error of alignment but at the same time transmit true rotary movement from the lever 12.

The oil-collecting dome 2 is of such a shape that it will confine the recovered oil in a restricted space which will give the greatest depth of oil with the minimum area, with a view to ensuring that a deep solid layer of oil is as far as possible always presented to the oil outlet from the dome. This provision of oil depth in the dome 2 minimises the tendency of the water to bore through the oil when the latter is discharging through the outlet aperture into the pipe 23. We are aware that various shapes are possible to achieve this result, but our experience of boiler shop practice shows that the cheapest, strongest and at the same time the most effective dome is made by providing a semi-cylindrical dome, with flat ends to take the necessary access covers to allow the cylinders to be inserted or removed as and when required. This shape of dome 2 is illustrated in Figs. 1 and 3. This dome 2 is provided with the necessary oil outlet-branch 23 on top and also a hand-hole with cover for inspection and testing of the operational stroke of the main cylinder 8.

If the oil discharge-valve be fitted directly to the top of the oil-dome 2, there is a danger of water passing out with the discharged oil because of the tendency for the water to bore through the oil-layer. This may be overcome by providing a suitable length of "oil-seal" discharge pipe 23 between the dome 2 and the lid 28 of the oil discharge valve. The area of this pipe 23 will vary according to the hourly output of the separator to allow the maximum rate of oil discharge with the lowest cross-sectional area value to reduce boring. The length of the pipe 23 will vary for each size of separator and will thus contain a given fraction of the hourly capacity to prevent the water lever reaching the oil-discharge valve lever.

Figure 13:
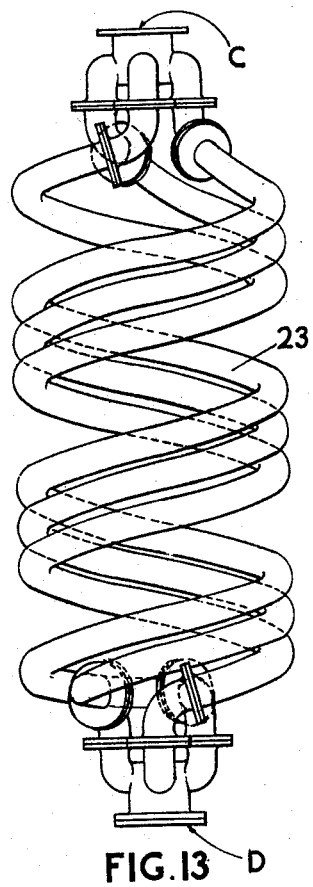
Fig. 13 is an elevation of a spiral arrangement of oil seal pipes.
Figure 15:
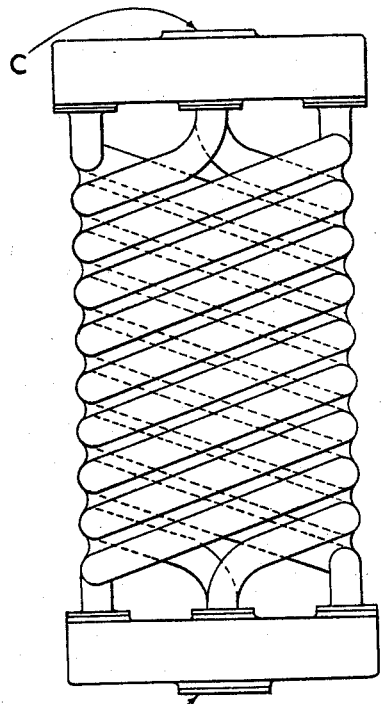
Fig. 15 is an elevation of a spiral form of oil seal made as a casting with loose headers at the top and bottom each forming a common collecting chamber for the spiral passages.
Figure 14:
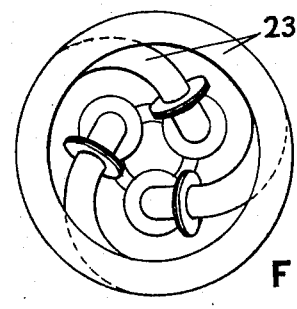
Fig. 14 is a plan of the pipes shown in Fig. 13.
Figure 16:
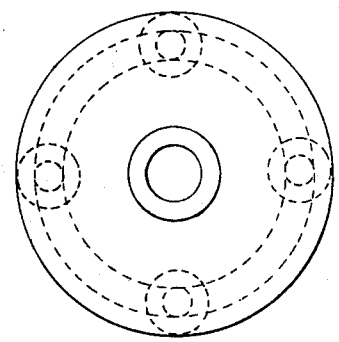
Fig. 16 is a plan of the arrangement shown in Fig. 15.

As it may be different in confined spaces to accommodate the required vertical length of piping, Fig. 11, the pipe 23 may be inclined at an angle of not less than 20°, otherwise the free flow for the exchange of oil and water content in this pipe is impeded, and there is a liability to lock in blobs of water if the oil being dealt with is very viscous. An inclined oil discharge pipe is illustrated in Fig. 12. As an alternative, the pipe 23 may be constructed in the form of a spiral with the coils at an angle of not less than 20°, Figs. 13 and 14. Where the pipe diameters are large, it may be found that a large diameter of coil would be necessary because of the bending centres required which would make the coil bulky and cumbersome and call for special supports which would increase the cost. In such cases the coil-form may be constructed as a casting to give the smallest possible diameter of coil Figs. 15 and 16. Alternatively it may be constructed and fabricated by welding steel plates to produce the same effect, Figs. 17–18. In each of these Figs. the pipe 23 or pipe assembly joins the oil discharge valve at C and the tank 1 at D.

The shutter-baffles or hydraulic baffle-plates 20, 20a are so constructed that the passages at their outer end form venturi openings E in order to give momentary squeezing effect to the troublesome globules of water encased in oil skins, as this is more efficient in bursting the oil skins and allowing this oil thereby to form droplets which can more readily rise out of the flow path. The venturi effect may be obtained by welding bars or angles to the ends of the baffle plates, as shown in Figs. 1, 4 and 5.

On the top of the compactor chamber there is provided a sheet of standard type expanded metal of suitable thickness and size of mesh selected to suit each capacity of separator and to form the compactor grid 4. This expanded metal grid 4 is constructed with a hinged door 4A in the centre to give access for examination of the compactor chamber when required, Fig. 2. This type of grid is cheap to supply and fit as it only requires trimming to shape and then electrically welding where necessary to maintain its fitted position and at the same time it is extremely efficient.

It has been found that ordinary float-operated piston valves or rotary valves are unsuitable for controlling the opening and closing of the oil and water discharge valves, because of the infrequent operating cycles when oil is accumulating in the dome. Experiments were therefore carried out to see whether a more precise control valve could be designed, which by its method of construction could be provided with fine port openings and close positioning thereof without leakages occurring which could cause erratic opening or closing if the stroke travel was very slow, due to oil accumulating very slowly in the collection dome through there only being a very small percentage of oil-fouling in the flow water.

It has been found that the usual construction method for piston valves, whilst satisfactory for quick moving pumps or other machines failed to prevent steam or air pressure leakages past the pistons and rings when the motion became very slow. These steady leakages can build up on the other side of the piston and cause an unwanted action of the gear to occur. We have therefore evolved a special form of construction for the required piston-control valve B, operable by the displacement cylinders and transmission shafting, to control the opening and shutting of the oil and water discharge valves from the tank, where such opening or closing may only occur at lengthy intervals of hours, days or weeks, depending on the percentage of oil to be removed from the flow water. A number of adverse factors had to be overcome including pressure leakages past pistons or piston rings, whether whole or split rings and prepassing of pressure, steam or air, because the ports could not be made fine enough where cast or drilled porting was used in a single casting. There was also the danger of leakages (because of faulty castings) between the labyrinth of cast ports necessary to give the change of motion and the reversal of pressure and exhaust ports.

We have therefore produced a novel form of construction for control valves for separators which overcomes these problems. For example, in the new valves the porosity of castings especially between cast passages has been eliminated by avoiding all cast openings. This is achieved by constructing the valve body shell or casing from a series of flat slabs 33 to 38 which are cast solid and can be examined for any surface flows or porosity immediately after both sides have recived a first machining or grinding to expose the texture of the metal.

Figure 20:
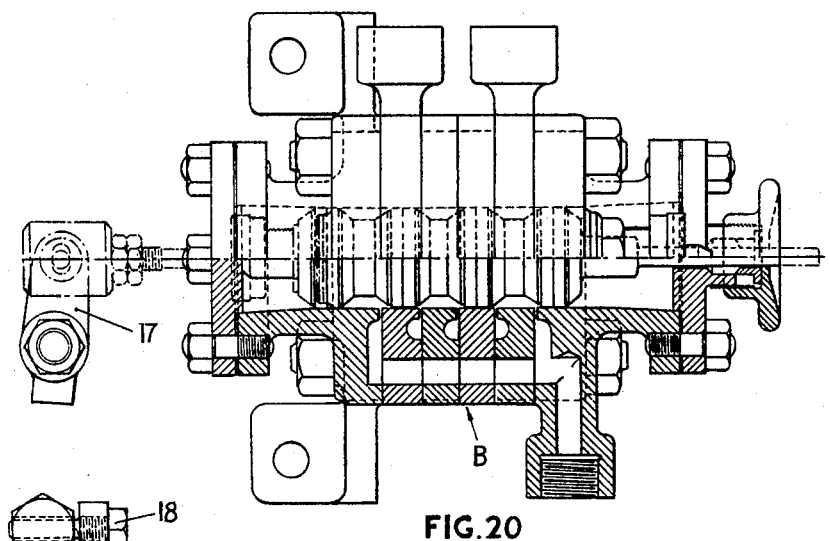
Fig. 20 is a sectional plan view of an assembly of component parts forming a piston control valve.
Figure 22:
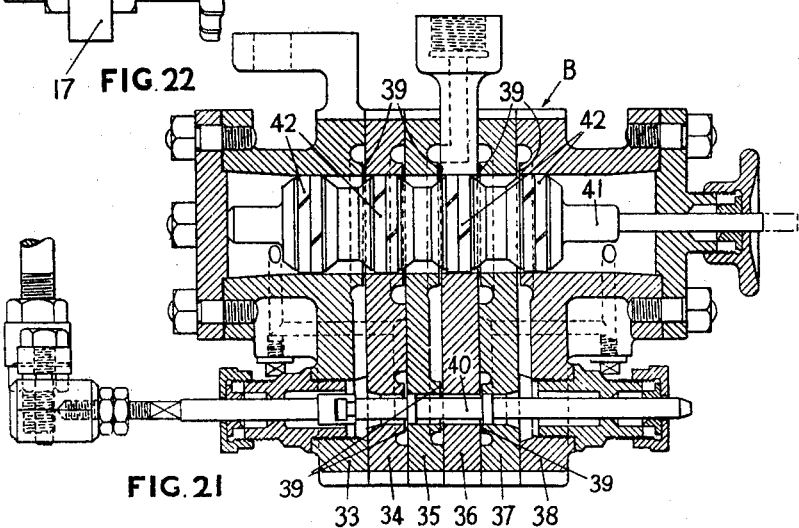
Fig. 22 is a detail view of connections between the transmission shaft and the piston control valve.

The number of slabs employed depends on the number of port openings required. In Figs. 20 and 21 references 33 to 38 indicate an assembly of six slabs some of which carry the necessary brackets or branches required in the final assembly. The two outer slabs 33 and 38 are shewn with flanged extensions to take bolted covers for closure of the cylinders and other slabs have cast bosses or branches to form pressure inlet or exhaust outlet connections at the required positions.

In manufacture, all holes large or small are drilled or bored out of these solid-cast castings to avoid casting porosity of ports. The faces of each slab are machined and precision ground to give exact gauge thickness of each slab. On each slab, circular recesses 39 are milled out around each of the two piston bore-holes and the inner ring thus formed around the bore is then precision ground below the level of the face of the slab. This forms a circular recess 39 of very fine opening around the bore at each slab and ensures correct positioning of each port when all the slabs are bolted together to form one body or casing. All other holes or ports are either drilled or milled to guage out of the solid casting of each slab so that each portion can be carefully examined against possible porosity or cracks which would allow leakages.

The various slabs are assembled using a thin smear of spirit shellac only, as a jointing medium and the slabs are secured and held together by means of close fitting bolts or studs securely tightened up. To the assembled valve body are fitted two pistons—the master piston, 40, Fig. 20 being of small diameter, manufactured from any suitable metal, but preferably from stainless or silver steel to prevent rusting and the blow over piston 41, Fig. 20 of larger diameter and consisting of a mild steel body having a number of grooves to take piston or packing rings 42. To each of these grooves is fitted a set of three interlocking piston rings 42, which are so constructed that the steam or air pressure cannot pass the rings, as all saw cuts through the rings, to give them "spring," are fixed at positions which prevent these cuts working into line with the cut in the neighboring ring and so providing a passage for pressure leakage. These piston rings are accurately positioned to act as piston bars to cover and uncover the fine apertures 39. The larger piston 41, is termed the "blow-over" piston, as it is blown to one end or the other of its chamber by the operation of the small master piston 40, which is actuated by the two displacement cylinders 8 and 9 which act as rams.

In the compactor chamber, Fig. 1, the swirl-chambers A are formed of corrugated baffles. These corrugated baffles form pockets or recesses to slow up the forward movement of the inlet flow thereby reducing turbulence and also preventing the compacted oil masses from piling up at the far end in an unequal manner and so causing a block-up of the designed passage areas.

A power-operated-valve in the body 24, Fig. 1 is provided for the periodic discharge of the separated and recovered oils stored in the oil collecting dome 2 until sufficient oil has accumulated to form the charge necessary to cause the weight-volume cylinders 8 and 9, to operate and so via the transmission shaft 13 to convey this movement to the master piston 40, Fig. 20. This piston 40 actuates the blow over piston 41, and so causes steam or air pressure to be passed up the pipes leading to the top or the bottom of the power cylinder of the oil discharge valve 24, Fig. 1 according to the position of the displacement cylinders.

When the main cylinder 8 is at the top of its stroke, there being no oil in the collection dome, the piston control valve Fig. 20 will be supplying pressure to the top side of the piston in the power cylinder of the oil-discharge valve 24 in the body, thereby keeping it firmly closed so that no oil can pass out. During this phase, the piston control valve will have opened an exhaust port, thereby allowing the space on the underside of the piston of the oil discharge valve to exhaust freely to a condenser or to the atmosphere. When the main cylinder 8 drops to its lowest position, due to a full charge of accumulated oil in the collecting dome, the movement will be conveyed by the lever 12 and the transmission shaft 13 to the piston control valve, so causing the blow over piston 41 to pass to the other end of its stroke to reverse the steam or air ports leading via the small supply pipes to the power cylinder 25, of the oil discharge valve. This means that the top side of the piston is now open to exhaust, whilst the under side of the piston is open to steam or air pressure which will cause the valve to open and so allow the accumulated oil to be discharged from the oil dome 2.

Fig. 1 shows a sectional arrangement of one of our designs of oil valve, using steam, air or hydraulic power as the operating medium. The shut off valve lid and seat 28 are of the mushroom type, but other types of valves including sluice valves may be employed instead. Where both the oil discharge and the water discharge valves are to be mechanically operated we propose to fit two of our power operated discharge valves, oppositely coupled to the usual piston control valve. This arrangement ensures, that when the oil-valve is opened, the water valve is shut and vice-versa.

If it be found that steam, air or hydraulic power cannot be provided, then the oil and/or water discharge valves may be opened and closed by means of electric motors of suitable design attached to the valves instead of the usual steam or air cylinders or by suitable solenoids.

The motors may be operated by suitable control switches actuated by the displacement cylinder assembly, instead of the piston control valve, or by any form of electric control including electronic detector controls.

Figure 6:
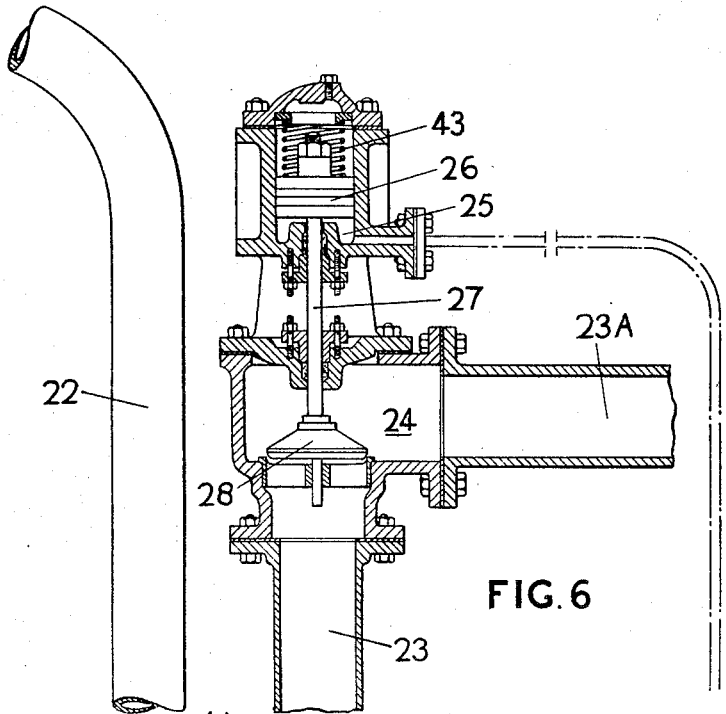
Fig. 6 is a detail view of a spring loaded discharge valve.

Fig. 6 shows an alternative type of the fluid pressure operated oil or water discharge valves.

In this design the closing of the valve is obtained by means of a suitable coiled spring 43, to ensure the valve remaining definitely shut even if the steam or air supply is cut off. The valve is still open by means of a piston 26, but in this case a simpler form of piston-control valve can be utilised, as only one pipe is led up to the cylinder, this becoming alternately steam or exhaust according to the position of the displacement cylinders of the control mechanism.

When the valve is closed by the spring 43, the under side of the piston in the power cylinder will be open to exhaust, but when steam or air is admitted to the under side of the piston this will rise and open the discharge valve 28, the coiled spring 43, being compressed during this phase, as the area of the piston and the fluid pressure is greater than the spring pressure.

Figure 7:
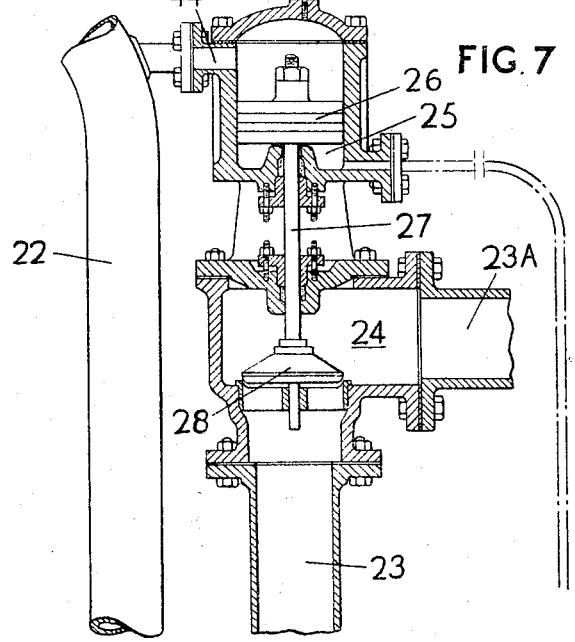
Fig. 7 is a detail view of an alternative form of discharge valve controlled by constant water pressure and steam.

In an alternative design of discharge valve Fig. 7, instead of having the valve closed by a coiled spring or by steam or air pressure on top of the piston, we provide a valve of special design wherein the pressure to close the valve is obtained by leading a pipe 44, or other connection from the clean-water space of the separator, so that the "constant" pressure of the water flow passing through the separator is able to pass up the pipe into the power cylinder and act upon the top side of the piston 26, and so push it down thereby closing the discharge valve 28.

The cross-sectional area of the piston 26 in the power cylinder, must be greater than that of the valve lid 28 which is naturally subject to an upthrust effort at the same "constant" pressure per square inch from the flow water. This means that there is a constant pump pressure always acting in a downward direction to close the discharge valve or valves 28 but this is allowed for in the opening stroke as the steam or air pressure admitted to the under side of the piston by the piston control valve Fig. 20 is of a much higher pressure per square inch than the "constant" pressure of the water flow through the separator. As a result the steam or air pressure overcomes the "constant" pressure and by an excess of power, forces the piston upwards, and so opens the discharge valve 28. When the oil has been discharged from the collecting dome 2 the displacement cylinders 8 and 9 react accordingly and actuate the piston control valve in the opposite direction. This causes the steam supply to the underside of the power-piston to become exhausted and the "constant" pressure is again able to close the valve.

The apparatus operates as follows:

Oily water enters the separator tank by the inlet pipe 21, the mixture either gravitating to the separator, or it is fed into it by a suitable pump. On entering the compactor chamber the flow is broken up into two opposite moving flows which immediately reduce its inlet momentum to half. The mixture then passes out sideways through slot passages formed by the curved baffle plate. The flow is now diverted by the curved hood baffles which cause it to take up a rotary path. This rotary motion causes the heavier liquid to be thrown towards the periphery whilst the lighter fluid in the flow mixture is retained in the centre of the rotating mass. When a given quantity of oil has accumulated the mass effort of the accumulation enables it to break out of of the rotating flow, and it naturally ascends and comes into contact with the underside of the expanded metal barrier situated above. The oil spreads out over the underside of this expanded metal grid 4 and then flows through the openings, rising upwards towards the collecting dome 2 in a number of continuous streams, thereby ensuring a steady flow.

Practically all the oil content is removed from the flow up to this stage, but the small fraction remaining which is computed to vary from 2% to 5% of the total oil, is mainly in the form of drops of water encased in oil-skins. These arise from frothing and surging in the pump chambers whilst the oily-water is being pumped to the separator. These drops are very troublesome to break up as they are so near to the specific gravity value of the heavier liquid, of which they are mainly composed. We therefore provide hydraulic baffle plates 20 or 20a by welding rods, tubes, angle bars or other suitable sections to the rear-end of these plates, so causing them to form venturi openings. This momentary compression or restriction of the flow causes increased distortion of these troublesome water globules and this results in the oil-skins breaking and allowing solid drops of oil to form instead, which by their gravity values rise to the top and so reach the oil collecting dome. We provide the centre plate division 19 to form a "return-flow" which shortens the length of the separator tank by half. A second set of the improved hydraulic baffle-plates, 20 or 20a are fitted below this centre division so that the last of the water globules can be dealt with before the cleansed water reaches the outlet 22, for final discharge.

With this apparatus we obtain a high efficiency and by test analysis we find that the oil content remaining in the cleansed water can be as low as .0004% or 4 parts of oil in a million parts of water.

What is claimed is:

In an apparatus for separating liquids of different specific gravities from a mixture of such liquids, the combination of a tank having front and rear ends, a substantially horizontal partition provided in said tank and dividing the same into upper and lower chambers, said partition having a rear edge spaced forwardly from the rear end of the tank whereby to provide a passage in the rear end portion of the tank communicating said upper and lower chambers, a liquid mixture inlet communicating with the front end portion of the upper chamber, outlets for relatively light and relatively heavy liquids communicating with the upper portion of the upper chamber and the lower portion of the lower chamber respectively, and baffle means provided in the tank for separating the lighter liquid from the heavier liquid prior to travel thereof through said passage, said baffle means comprising a plurality of spaced vertical baffle plates extending transversely in the tank above the rear portion of said partition and disposed in forwardly and upwardly staggered relation, and pairs of flat upwardly divergent flanges provided at upper edges of said baffle plates, said flanges of adjacent baffle plates defining therebetween flow paths of a smaller horizontal dimension than the spaces between the baffle plates and having sharp edges whereby globules of the liquid mixture passing through said flow paths may be momentarily squeezed and scraped by said sharp edges and skins of lighter liquid encasing heavier liquid separated therefrom.

References Cited in the file of this patent

UNITED STATES PATENTS

| | | |
|---|---|---|
| 757,448 | Friesdorf | Apr. 19, 1904 |
| 996,553 | Bailey | June 27, 1911 |
| 1,702,612 | Morse | Feb. 19, 1929 |
| 1,873,597 | Jones | Aug. 23, 1932 |
| 2,036,730 | Thompson | Apr. 7, 1936 |
| 2,214,248 | Hawley | Sept. 10, 1940 |
| 2,315,017 | Thompson | Mar. 30, 1943 |
| 2,376,555 | Rocquin | May 22, 1945 |

OTHER REFERENCES

Booklet entitled "The 'Coastguard' Patent Oily-Water Separator," pages 8 through 17.